United States Patent Office 3,524,196

Patented Aug. 11, 1970

3,524,196

PIEZOELECTRIC ACTUATORS

Peter Dudley Church and Chris Stavros Sideras, London, England, assignors to English Electric Computers Limited, London, England, a British company Filed Mar. 11, 1968, Ser. No. 711,983

Claims priority, application Great Britain, Mar. 10, 1967, 11,305/67

Int. Cl. H01v 7/00

U.S. Cl. 310—8 4 Claims

ABSTRACT OF THE DISCLOSURE

An actuator of particular application to data storage apparatus, in which the desired relative movement between the actuator output member and the actuator body structure is produced by piezoelectric elements in response to an electrical signal. Preferably the actuator includes a stack of piezoelectric elements arranged longitudinally of one another for acting cumulatively in series, within the stack alternate elements being piezoelectrically oppositely orientated and connected in opposite senses between two input terminals. The actuator may include two or more such stacks in parallel and preferably arranged so that the actuator is substantially unaffected by the changes in ambient temperature. Where levers are provided for amplifying the movement produced by the elements, the levers are preferably each carried on flexure hinges and are formed integrally with one another. Where the actuator is used in data storage apparatus, it may be used to provide track selection and/or track following.

Figure 1:
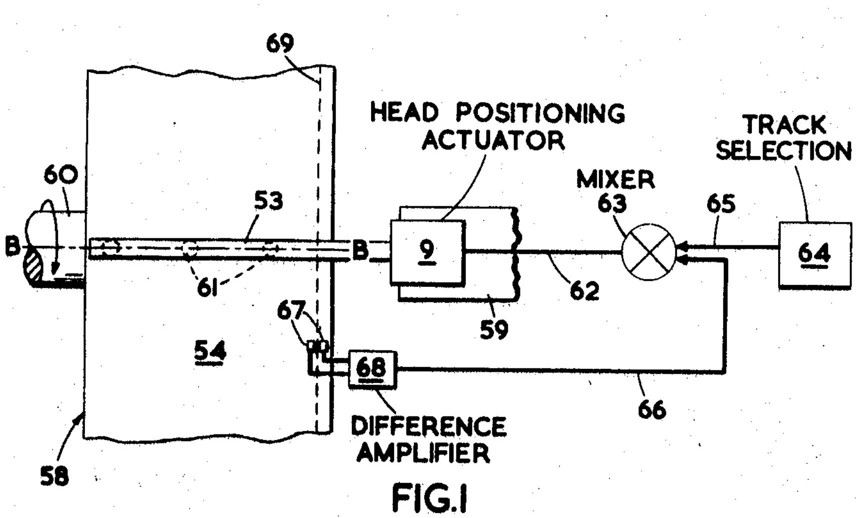

This invention relates to actuators.

The invention relates particularly, but not exclusively, to actuators for use in digital data processing apparatus of the kind in which data recording heads are energised to write digital data into, or read previously recorded digital data from, a magnetisable or other storage surface moved past the heads.

In many such data processing apparatus each head is required to co-operate with the data storage surface at any selected one of two or more discrete tracks spaced laterally of the surface, and one or more actuators are provided for producing the lateral movement of the heads which is required for track switching, and for positioning the heads laterally of the data storage surface for data writing or reading. It will be appreciated in this respect that the heads may each have an actuator individually associated therewith, or they may be arranged in groups of two or more heads, each group having a respective actuator.

To prevent substantial data processing time being wasted while track switching is being carried out, it is desirable that the speed of lateral movement provided for the heads be very high. Also, it is important that the heads when data writing or reading are accurately positioned laterally of the data storage surface; the accuracy with which the heads can be positioned influences, inter alia, the spacing required between tracks and hence the character density possible, and therefore should be as high as possible.

Actuators so far proposed for providing track switching and lateral positioning as described above have suffered from the disadvantage that their movable part (to which the head or heads are connected) have had considerable inertia and the speeds of track switching available have been accordingly limited, it being appreciated that the space occupied by the actuators is desirably as small as possible. Also, the nature of the previously proposed actuators has been such that slack can occur within them, and accordingly the accuracy of head positioning provided has also been limited.

It is an object of the present invention to provide an actuator which is compact when considered with regard to the output force it produces.

It is a further object of the invention to provide an actuator in which no slack can occur.

It is a further object of the invention to provide an actuator which is substantially unaffected by changes in ambient temperature.

According to the present invention an actuator comprises a body structure, an output member movable with respect to the body structure, and a plurality of piezoelectric elements in an arrangement having a first part located with respect to the body structure and having a second part movable relatively thereto, the piezoelectric elements being energisable from an electrical signal whereby the said piezoelectric arrangement may responsively undergo a corresponding change in the dimension between the said parts thereof, and the said arrangement being mechanically connected in series between the structure and the output member whereby such dimensional change of the arrangement may cause a corresponding desired relative movement of the output member with respect to the body structure.

Preferably the said arrangement of piezoelectric elements is generally cylindrical in form the piezoelectric elements being mutually disposed longitudinally of the arrangement and being mechanically arranged and electrically connected for acting cumulatively in series longitudinally of the arrangement in response to the said electrical signal.

Conveniently the arrangement when in this cylindrical form has first and second leads between which the piezoelectric elements are connected in parallel, alternate elements of the arrangement being connected in opposite senses between the leads but piezoelectrically being oppositely orientated, whereby the elements, in response to the said electrical signal, act cumulatively in series longitudinally of the arrangement. A resilient biassing means is preferably provided between the said second part of the said arrangement and the body structure for biassing the piezoelectric elements towards one another longitudinally of the assembly at all times and for resiliently accommodating the movement of the said second part relative to the structure due to a said dimensional change of the arrangement in response to the said electrical signal.

In order that the actuator may be substantially unaffected by changes in ambient temperature, there are preferably provided at least two of the said generally cylindrical arrangements of longitudinally disposed piezoelectric elements, the said arrangements having their said second parts connected to a common crank member movable about an axis, the torques about the said axis exerted on the crank member by the individual arrangements when energised with the said electrical signal being of the same sense whereby the total torque on the crank member is the sum of the magnitudes of the individual torques and the arrangements are effective additively to cause the said movement of the output member, but the changes in the said individual torques due to a change in ambient temperature being of such relative magnitude and sense that due to the temperature change substantially no change in the total torque on the crank members occurs.

In some applications of the actuator the output member of the actuator can be arranged directly to receive the movement of the second part of an arrangement of piezoelectric elements produced by a dimensional change of the arrangement. In most applications however it is necessary to amplify the movement before passing it to the output member. Preferably such amplification is effected by one or more levers each carried from the body structure by a flexure hinge.

Because of the high speed of movement which it provides, the actuator, when used in a digital data processing apparatus as described above, may be used to provide a track following facility in addition to, or alternatively to, the track selection facility previously described. For this, the actuator is connected for receiving, as part or all of the said electrical signal, a signal indicative of any lateral displacement of the associated data storage surface from a datum position thereof, the actuator being responsive to the said displacement signal to move the associated data head or heads laterally of the data storage surface in the sense and magnitude of the displacement.

Figure 5:
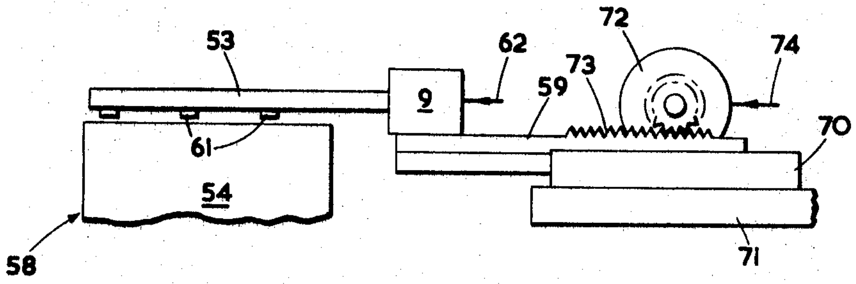
Figure 2:
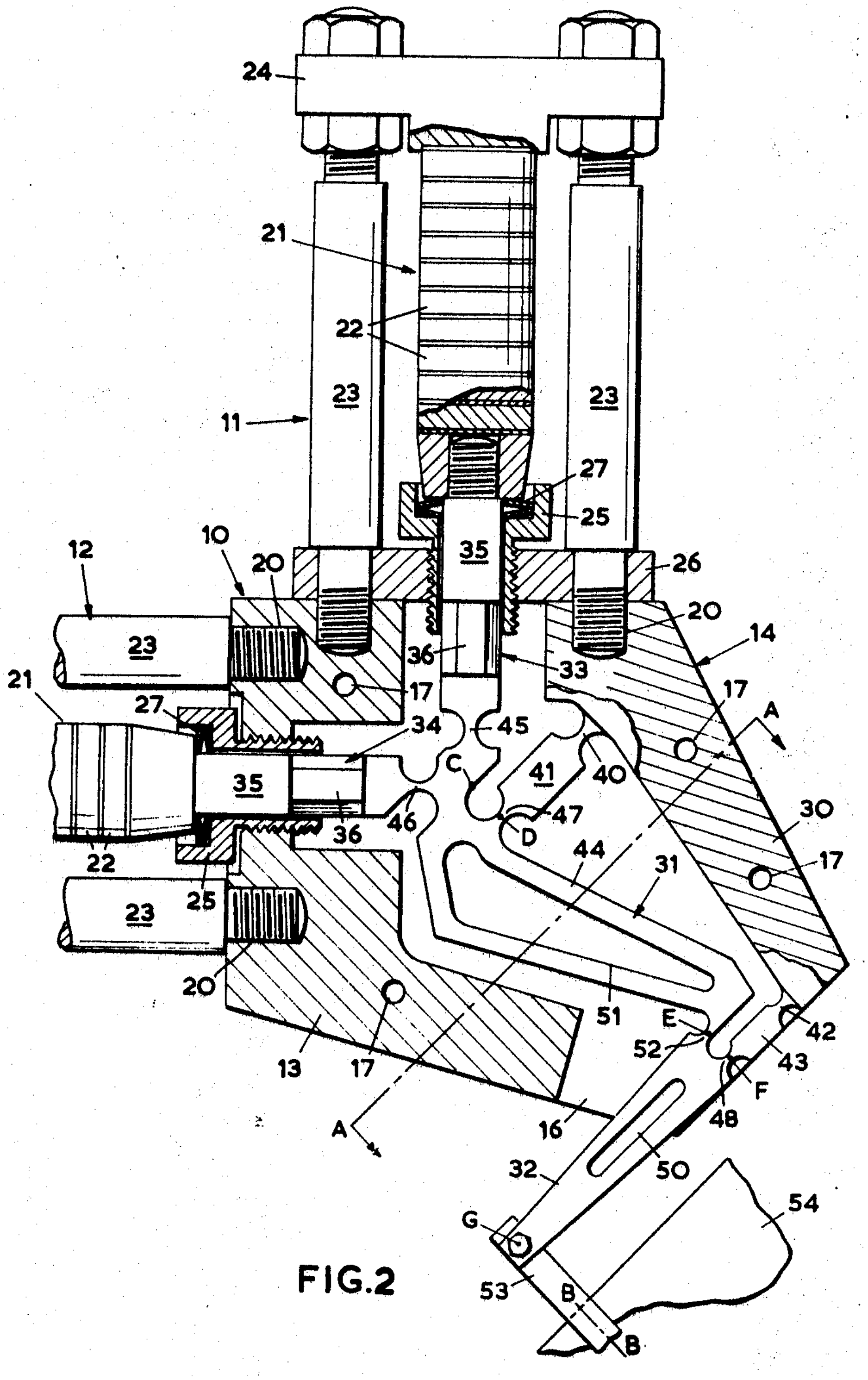
Figure 3:
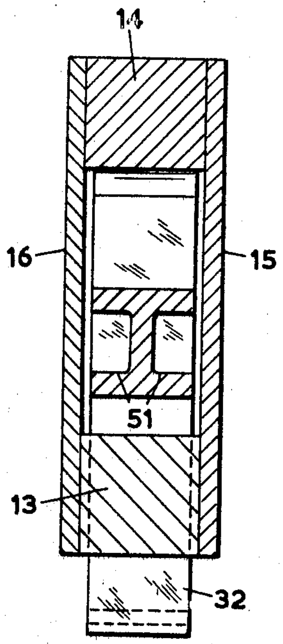
Figure 4:
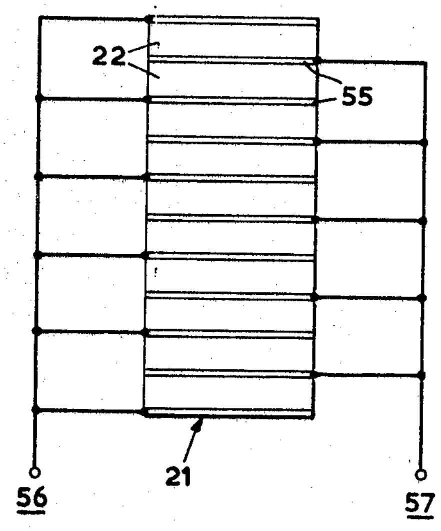

In order that the invention may be more clearly understood, a digital data storing apparatus including an actuator in accordance with the invention will now be described, by way of example, with reference to the accompanying drawings, in which:

FIG. 1 diagrammatically shows the general arrangement of the relevant parts of the apparatus, FIG. 2 is a part sectional view of the actuator showing the internal arrangement thereof, FIG. 3 is a sectional view of the actuator along the line A—A of FIG. 2, FIG. 4 illustrates how the piezoelectric elements of the actuator are arranged and energised, and FIG. 5 diagrammatically shows how the actuator of FIG. 1 may be mounted for increasing the data storing capability of the apparatus of FIG. 1.

Referring now of FIG. 1, the digital data storing apparatus is shown in use in co-operation with a cylindrical data storage member 58 (only shown in part) which is rotated by a shaft 60 about an axis BB in the direction indicated by the arrow.

The member 58 carries on its outside surface 54 a magnetisable data storage medium on which digital data may be recorded by three magnetic heads 61 carried by a pad 53.

The pad 53 is supported with the heads 61 closely adjacent to, and riding aerodynamically above, the data storage surface, by an actuator 9, itself carried by a member 59. The pad is movable by the actuator 9, relatively to the member 59 and transversely of the data storage surface, in response to an electrical signal on a line 62 connected to the actuator.

This signal, passed on to the line 62 from a mixer 63, is the sum of two signals one of which is derived from a track selection device 64 along a line 65 and the other of which is derived along a line 66 from a displacement sensing arrangement comprising two sensing heads 67 and a difference amplifier 68.

Operation of the apparatus of FIG. 1 is as follows. As is well known in the art, the heads 61 are simultaneously but independently energisable by means not shown to "write" digital data into, or "read" previously recorded digital data from, the data storage surface immediately beneath them. Such reading and writing occurs at a number of discrete tracks which are spaced transversely of the data storage surface.

It is assumed for the sake of example that fifteen such tracks are used, so that each head is required to cover five tracks in its respective third of the data storage surface. It will be appreciated that when, for example, one of the heads 61 is positioned above the centre one of its five tracks, the other two heads will also be positioned above the centre ones of their five tracks. In a similar way, the other tracks of the data storage surface are associated in groups of three.

The function of the actuator 9 (which operates as is later to be described) is both to position the pad transversely of the data storage surface so that the heads may co-operate with the surface at a selected one of the groups of three tracks, and also, when such positioning has been effected and data recording and/or sensing is occurring, to move the pad in an analogue manner in accordance with axial movements of the data storage member. The actuator 9 therefore provides both for track selection and track following.

The movement of the pad 53 for track selection is effected by the actuator 9 in response to a signal which is derived from the track selection device 64 and which is representative of the desired pad position. In response to this signal the actuator 9 moves the pad 53 transversely of the data storage surface to the position at which the three heads 61 correspond to the surface at the required group of three tracks. The heads may then be separately energised as previously described to write data into, or read data from, the data storage surface at those tracks.

As will later become apparent, the actuator 9 is such that the pad position is infinitely variable between its limiting positions in response to an analogue signal on the line 62. To provide the discrete pad positions required, the signal from the device 64 therefore has a number of discrete values each corresponding to a particular pad position.

For convenience, a zero signal on the line 62 gives the pad position required for the heads 61 to co-operate with the data storage surface at their respective centre tracks. The signal from the device 64 is therefore required to be reversible for providing the necessary pad travel.

Movement of the pad 53 for the track following facility previously mentioned is effected by the actuator in response to a signal derived as is now to be described by the displacement sensing arrangement comprising the sensing heads 67 and the difference amplifier 68.

A track 69 (FIG. 1) additional to the fifteen tracks previously mentioned is pre-recorded on the data storage surface where indicated. The two sensing heads 67 are rigidly mounted above this track with a small transverse spacing between them, and each provides to the difference amplifier 68 a signal of which the magnitude is proportional to its spacing from the track 69.

When the member 58 is in its correct axial position, the track 69 lies midway between the heads 67, and the two signals are equal. The difference amplifier 68 therefore provides no signal, and the pad position is unaffected.

If, however, the member 58 undergoes an (unwanted) axial movement due to, say, slack in its bearings, then a corresponding difference in the signals from the heads 67 occurs, and an output signal having a magnitude and sense indicative of the magnitude and direction of the movement is produced by the amplifier 68.

This output signal is passed to the actuator via the mixer 63, and the actuator accordingly moves the pad in accordance with the movement of the member 58 so causing the heads 61 to follow the tracks determined by the magnitude of the signal from the track selection device 64. In this way the adverse effects of any axial movement of the member 58 are substantially overcome.

The provision of this track following facility allows the tracks to be spaced apart by a smaller distance than would otherwise have been possible and/or increases the range of practical values for the clearance of the heads from the data storage surface.

The track following facility requires the actuator to have a very fast rate of response. As will now become apparent from the following description given with reference to FIGS. 2, 3 and 4, the actuator is given the required fast response by the use of piezoelectric elements.

Referring now to FIGS. 2, 3 and 4, the actuator 9 comprises a pentagonal body portion (generally indicated by the reference numeral 10) and two orthogonally disposed piezoelectric stack assemblies 11 and 12 secured to the body portion.

The body portion 10 comprises a bracket 13 and a member 14 sandwiched between a cover plate 15 and a base plate 16. The cover plate 15, which is not shown in FIG. 1, is secured to the bracket 13 and the member 14 by bolts (not shown) in threaded holes 17. The base plate 16 is similarly secured to the bracket 13 and member 14 at the underside of the body portion.

Formed in the bracket 13 and member 14 on one side of the body portion are threaded holes 20 by which the stack assembly 11 is secured to the body portion. The stack assembly 11 has a stack 21 of piezoelectrical discs 22 longitudinally disposed. This stack 21, which is later more fully to be described with respect to FIG. 3 is clamped by tie bolts 23 engaging the holes 20 between a first clamping plate 24 and a cup-shaped spring housing 25 threaded into a second clamping plate 26 adjacent the body portion.

Belleville washers 27 are located in the spring housing as shown and allow a small axial movement of the respective end of the stack 21 with respect to the housing (as is later to be described) while applying a compressive force axially of the stack at all times.

The stack assembly 12 is similar to the assembly 11 and similarly comprises a stack 21 of piezoelectric discs 22, which is clamped by tie bolts 23 between a clamping plate (not shown) and a spring housing 25 through Belleville washers 27. No further clamping plate such as is shown at 26 for the assembly 11 is provided for the assembly 12, the housing 25 and the tie bolts 23 thereof being threaded directly into the bracket 13 at one side of the body portion.

The member 14 has two basic ports which are integrally formed from a single piece of magnesium alloy. One part of the member is denoted by the reference numeral 30 and is secured between the base and cover plates as has previously been described so as to support the second part of the member in position between the base and cover plates.

This second part is denoted by the reference numeral 31 and provides a lever mechanism whereby axial movement of the end adjacent the body portion of the stacks 11 and 12 is transmitted, amplified, to an arm 32 which forms an integral part of the lever mechanism and projects from the body portion.

The function of this arm 32 will later become apparent from the description of the operation of the actuator which follows later in the specification.

The arrangement of the part 31 of the member 14 is as follows. The part 31 is spaced from the cover and base plates 15 and 16 (see FIG. 3) and is cantilevered in position from four spaced supports.

Two of these supports are provided by threaded connections made to the inner ends of the stacks 11 and 12 at the ends of orthogonally disposed rod portions 33 and 34 of the part 31. Each rod portion passes through a central bore in the spring housing associated with the stack to which it is attached and is a clearance fit in the bore at a part 35 of circular cross-section. A part 36 of each rod portion has a hexagonal cross-section as a transition between the circular part 35 and the remainder of the part 31 (which is of generally rectangular cross-sectional form).

The two other supports for the part 31 are provided by the part 30 which, as previously described, is sandwiched between the cover and base plates (15 and 16). One support is through a neck 40 formed between the part 30 and a fulcrum portion 41, the other support is through a further neck 42 by which an extension 43 of the arm 32 is attached to the part 30.

The part 31 of the member 14 further comprises a central portion 44 to which is attached the rod portion 33 through a neck 45, the rod portion 34 through a neck 46, the fulcrum portion 41 through a neck 47, and the extension 43 through a neck 48.

Hollows 50 and 51 are respectively formed in the arm 32 and the central portion 44 at the upper and lower surfaces thereof so that the weight of these members is at a minimum commensurate with the rigidity required.

As is shown in FIG. 2, the necks 40, 42 and 45 to 48 are each formed by drilling two part-holes of diameter and spacing to give the necessary neck thickness. A further neck 52 formed between the arm 32 and the central portion 44 is similarly formed by this method.

The actuator as a whole is secured at its underside to the member 59 (shown in FIG. 1) and carries the pad 53 at the end of its arm 32. As has previously been shown and described with reference to FIG. 1, the actuator is responsive to an electrical signal supplied along the line 62. The line 62 is omitted from FIG. 2 for clarity but the energisation of the piezoelectric elements of the stacks 21 will become apparent from the description now to be given with reference to FIG. 3.

Referring now to FIG. 3, each stack 21 comprises a plurality of the piezoelectric discs 22 longitudinally arranged. In each stack, alternate discs are oppositely orientated and between each pair of adjacent discs is disposed a copper disc 55. These copper discs are alternately connected to terminals 56 and 57 which are energisable with the electrical signal from the mixer 63, supplied along two connections (not shown) together constituting the line 62.

The stacks 21 are thus electrically connected in parallel across the line 64 and are so arranged that, in response to a finite signal on the line 62, the discs 22 of one stack expand while the discs of the other track contract, that is longitudinally of their respective stack assemblies, in accordance with the polarity of the signal on the line 62. It will be appreciated that the magnitude of such expansion and contraction is directly proportional to the magnitude of the signal on the line 62.

Assuming, for example, that the polarity of the signal on the line 62 is such that the stack 21 of the assembly 11 expands and that of the assembly 12 contracts. The rod portion 33 is therefore caused to move towards the body portion, and the rod portion 34 is similarly moved away from the body portion.

The lines of movement of the two rod assemblies intersect at the point C and the two stacks 21 in combination therefore produce an anticlockwise bending moment about the neck 47.

The neck 47 therefore acts as a non-slip hinge about which the central portion 44 pivots in an anticlockwise direction.

In response to this movement the arm 32 is caused to pivot in a clockwise direction about the hinge formed by the neck 52 and the data heads carried by the pad 53 are therefore moved in accordance with the magnitude of the signal on the line 62 and transversely of the data storage surface 54. During such movement various degrees of flexure will also occur at the necks 40, 42, 44, 45 and 48.

It will be appreciated that the heads will correspondingly be moved in the opposite direction when the signal on the line 61 has the opposite polarity, the magnitude of such movement again depending upon the magnitude of the signal.

As can clearly be seen from FIG. 2, the arrangement of the part 31 of the member 14 is such as to provide a substantial amplification of the movement provided by each stack 21. The ratio of the movement of the pad 53 (and hence of the data heads) to the movement of the inner end of each stack 21 is approximately equal to the porduct of *DE/CD* and *FG/EF* where C, D, E, F and G are the points indicated in FIG. 2; this ratio is therefore set to give the required movement of the heads by suitable choice of the dimensions of the component parts of the part 31.

It will be appreciated that the prestressing of the stacks 21 by the Belleville washers 27 and the use of flexure hinges instead of conventional pivots provides that little or no slack can occur either within the stacks themselves or between the output of the stacks and the pad 53.

The arrangement described of alternately orientated piezoelectric discs 22 and interposed copper discs 55 provides that each stack 21 is a mechanically satisfactory assembly which requires little electrical insulation since the discs are electrically connected in parallel and the maximum voltage of the signal on the line 62 can therefore be small. In a modification, each piezoelectric disc has silvered plane faces and adjacent faces are soldered together with a piece of conductive foil therebetwen for use as a lead connection.

It will be noted that, with the actuator shown and described with reference to the drawing, changes of ambient temperature can cause little or no movement of the arm 32 (and hence of the data heads) since the resultant changes of the torques which the stacks 21 exert about the point C are equal and opposite.

Many embodiments of the invention other than the embodiment particularly shown and described are possible, and it will be appreciated that an actuator in accordance with the invention is not limited in application to the apparatus shown in FIG. 1 but may also be used in other applications, particularly where very fast rates of movement are required, It is envisaged, for example, that actuators of the kind described could be used for impulsing the hammers of a high speed line printer in response to electrical signals thereto.

It will be appreciated that when applied to data storing apparatus, an actuator in accordance with the invention may be used for the fine positioning of a pad carrying heads, the coarse positioning of the pad being provided, for example, by a conventional rack arrangement. Thus, as is shown in FIG. 5, the actuator 9 of FIGS. 1 to 4 could be carried "pickaback" on the member 59 (see FIG. 1) which is itself located in guides 70 carried by a fixed structure 71 of the apparatus and is longitudinally movable in the guides by a motor 72 engaging the rack 73 with which it is formed. As is shown in FIG. 5, the motor 72 is connected for receiving on a line 74 a signal indicative of a required datum position of the pad 63; in response to this signal the motor moves the member 59 and hence the actuator 9 until the pad 53 with the actuator 9 unenergised is at the datum position. (In FIG. 5, the pad 53 is shown with the member 59 at the left limit of its travel.)

The actuator 9 may then be energized on the line 62 (as previously described) for locating each head at any one of the five tracks centered about its position corresponding to the datum body position, and for providing the track following facility as previously described.

The coarse pad position, provided by the movement of the member 59 allows the heads 61 to cover more tracks on the surface 54 than would otherwise have been possible, and a tandem arrangement such as is shown in FIG. 5 allows a high number of tracks per head yet allows a track following facility to be provided if necessary.

In the latter respect it will be appreciated that the track following facility is not essential, although it becomes increasingly more necessary with the tendency towards higher character densities and faster speeds. Thus the apparatus of FIG. 1 could be modified by the omission of the items 63, 66, 67 and 68.

If desired, the actuator 9 in the arrangement of FIG. 5 could be used solely for track following, track selection being effected solely by the rack arrangement.

Although the sensing heads 67 are rigidly carried by the fixed structure of the apparatus of FIG. 1, it will be appreciated that in some arrangements, particularly where no coarse positioning as is shown in FIG. 5 is provided, they may themselves be movable piezoelectrically in accordance with the signal from the amplifier 68. In arrangements where each head is required to co-operate with the data storage surface at only one track (so that no track selection facility is provided and the actuator 9 only provides track following), the sensing head 67 may be movable with the pad 53.

An actuator in accordance with the invention may have many different forms. Essentially the actuator comprises a body structure, an output member movable relatively to the body structure, and one or more piezoelectric elements mechanically interposed between the output member and the body structure. The piezoelectric element or elements are energisable from an electrical signal and correspondingly undergo a change in dimension. This change in dimension is referred to the output member either directly or through a transmitting device, and causes the latter to move relatively to the body structure to a position determined by the magnitude and, if appropriate, sense of the electrical signal.

Where a plurality of piezoelectric elements are provided, the elements may be mechanically arranged to act in series, series-parallel, or parallel, it being appreciated that a series arrangement of elements increases the magnitude of movement available as compared with one element, whereas a parallel arrangement of elements increases the force, and hence the speed of movement, available. It is for the latter reason that the two stacks 21 of FIG. 2 are provided.

The additional reason for the provision of the two stacks of FIG. 2 is to substantially nullify the effects of variations of stack temperature. The arrangement is such that the expansion or contraction of the stacks in response to such variation causes torques about the point D (FIG. 2) which are equal and opposite and so cancel one another out. Thus the position of the pad 53 will be substantially independent of temperature.

It will be appreciated that three or more stacks could be arranged in a similar manner to negate or substantially reduce the effects of temperature.

In addition to arranging piezoelectric elements in series, many possible ways exist for providing an actuator in accordance with the invention with an output movement which is greater than the movement available from one piezoelectric element, and the arrangement of levers shown in FIGS. 2 and 3 is only by way of example. Preferably where one or more levers are used, the levers are each carried from the actuator body by a flexure hinge. The levers and their flexure hinges may be formed integrally with one another (as is shown in FIG. 2), or the flexure hinges may be special inserts which are secured to the levers and to the actuator body structure.

In one possible arrangement an actuator in accordance with the invention has its output member carried at the end of a "bimorph" comprising two thin piezoelectric elements which are secured to one another at longitudinal faces thereof and which are so energisable that one contracts and the other expands longitudinally of the bimorph. The bimorph is thereby caused to bend rather in the manner of a thermal bimetallic strip to move the output member.

Where used in a data storage apparatus, an actuator in accordance with the invention enables more tracks to be covered per head than was hitherto possible, by reason of the fast rate of head movement available. It also seems possible to move a data head from one track to another during the time required for the "dead" space between the end of the first track and the heading message of the second track to pass beneath the head so that no data recording or sensing time need be wasted by track switching.

We claim:

1. An actuator including a body structure; an output member movable relative to the body structure; piezoelectric means having a first part located with respect to the body structure, having a second part movable relative to the body structure and energisable by an electrical signal for responsively undergoing a dimensional change between the first and second parts; a plurality of levers each formed integrally with a flexible hinge providing fulcrums therefore and integrally with one another in series connection with further flexible hinges therebetween; at least one of the lever being carried from the body structure, and in which the levers are connected between the second part of the piezoelectric means and the output member for receiving the movement of the second part relative to the body structure due to said dimensional change of the piezoelectric means in response to the said electrical signal and operative in response to movement of the second part to produce amplified movement of the output member.

2. An actuator including a body structure; an output member movable relative to the body structure; at least two piezoelectric means each having a first part located with respect to the body structure, having a second part movable relative to the body structure; each piezoelectric means being of generally cylindrical form and including a plurality of piezoelectric elements mutually disposed longitudinally of the piezoelectric means; the piezoelectric elements undergoing a dimensional change in response to an applied electrical signal and to change in ambient temperature and being arranged to produce a dimensional change between the first part and the second part equal to the sum of the dimensional change of the individual elements; and means connected between the second part of each piezoelectric means and the output member including a crank movable about an axis, said crank being connected at a radius to the second part of each piezoelectric means; energisation of the piezoelectric elements by the electrical signal being effective to cause the piezoelectric means to produce torques in the same sense about the axis and change of ambient temperature causing the piezoelectric means to produce torque substantially equal and opposite to one another whereby movement of the output member in response to the electrical signal applied to the piezoelectric elements is substantially unaffected by change in ambient temperature.

3. An actuator including a body structure; first and second piezoelectroc elements each having first and second ends and each mounted on the body structure by the first end; the first and second piezoelectric elements each being responsive to a change in ambient temperature to produce a force acting in a first sense between the first and second ends of the respective elements; the first piezoelectric element being responsive to an electrical signal to produce a force acting in the first sense between the first and second ends of the first element; the second piezoelectric element being responsive to the electrical signal to produce a force acting in a second sense, opposite to the first sense, between the first and second ends of the second element; an output member; a mechanical linkage connected between each second end and the output member; the linkage being responsive to the force produced by the first element in the first sense together with the force produced by the second element in the second sense to produce a resultant force effective to move the output member and being responsive to the force produced by the first element in the first sense and the force produced by the second element in the first sense to produce a resultant force ineffective to move the output member.

4. An actuator as claimed in claim 3 in which the mechanical linkage includes a lever; a pivot for the lever on the body structure and in which the mechanical linkage is responsive to the forces in the first sense produced by both first and second elements to produce a resultant force acting through the pivot of the lever and is responsive to the forces in the first and second senses respectively produced by both first and second elements to produce a resultant force having turning movement about the pivot.

References Cited

UNITED STATES PATENTS

| | | | |
|---|---|---|---|
| 2,513,269 | 7/1950 | Bauer | 310—8.5 X |
| 2,565,586 | 8/1951 | Bauer | 310—8.6 X |
| 2,924,981 | 2/1960 | Critchlow | 310—8.0 X |
| 3,289,468 | 12/1966 | Van Der Veer et al. | 310—8.7X |
| 3,296,476 | 1/1967 | Locher | 310—8.3 X |
| 3,315,520 | 4/1967 | Carnevale et al. | 310—8.7 X |
| 3,366,808 | 1/1968 | Steward | 310—8.3 |
| 3,377,489 | 4/1968 | Brisbane | 310—8.3 |
| 3,389,274 | 6/1968 | Robertson | 310—8.0 |
| 3,390,559 | 7/1968 | Steutzer | 310—8.6 X |

MILTON O. HIRSHFIELD, Primary Examiner

M. BUDD, Assistant Examiner